United States Patent [19]
Eads et al.

[11] 3,885,934
[45] May 27, 1975

[54] CENTRIFUGAL TUYERE FOR GAS SEPARATOR

[75] Inventors: Ralph Eads; Charles Langdon Campbell, both of Houston, Tex.

[73] Assignee: Heat/Fluid Engineering Corporation, Tulsa, Okla.

[22] Filed: June 19, 1973

[21] Appl. No.: 371,426

Related U.S. Application Data

[63] Continuation-in-part of Ser. No. 177,251, Sept. 2, 1971, abandoned.

[52] U.S. Cl. .................................... 55/457; 55/392
[51] Int. Cl. ........................................... B01d 45/12
[58] Field of Search ............. 55/452, 453, 455, 456, 55/457, 347, 348, 392

[56] References Cited
UNITED STATES PATENTS

| | | | |
|---|---|---|---|
| 1,896,897 | 2/1933 | Hawley | 55/455 X |
| 2,565,902 | 8/1951 | Wright et al. | 55/455 X |
| 2,662,610 | 12/1953 | Heinrich | 55/452 X |
| 2,936,043 | 5/1960 | Armstrong et al. | 55/457 X |
| 3,448,563 | 6/1969 | Sobeck | 55/347 |
| 3,461,652 | 8/1969 | Sato | 55/452 X |
| 3,546,854 | 12/1970 | Muller | 55/455 |

*Primary Examiner*—Frank W. Lutter
*Assistant Examiner*—William Cuchlinski, Jr.
*Attorney, Agent, or Firm*—Browne, Beveridge, DeGrandi & Kline

[57] ABSTRACT

A multi-bladed tuyere for imparting a helical motion to a moving gas stream is disclosed. The blades of the tuyere overlap in axial projection so that there is no through open area, and the gas stream thereby impinges the blades. The trailing edge of each blade includes a lip which projects in an upstream direction to trap liquids impinging the blades and causes them to drain radially outwardly. The lip terminates short of the outermost end of the blade causing the trapped liquid to flow off of the blade and onto the vessel wall.

9 Claims, 4 Drawing Figures

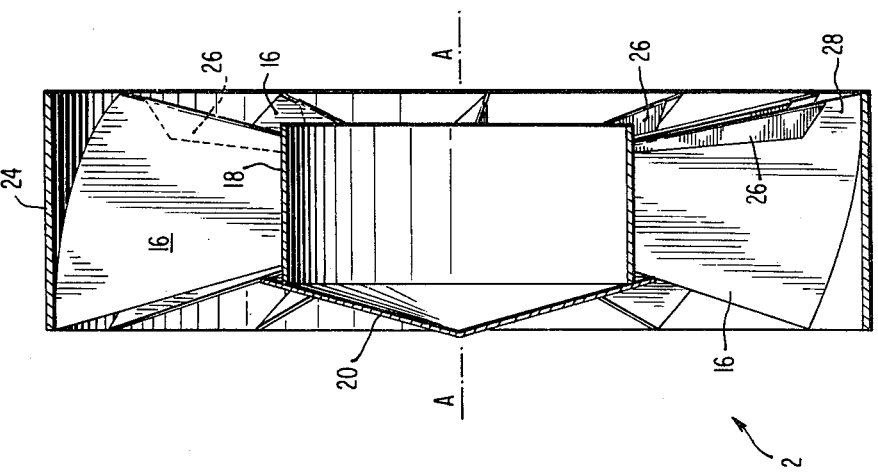
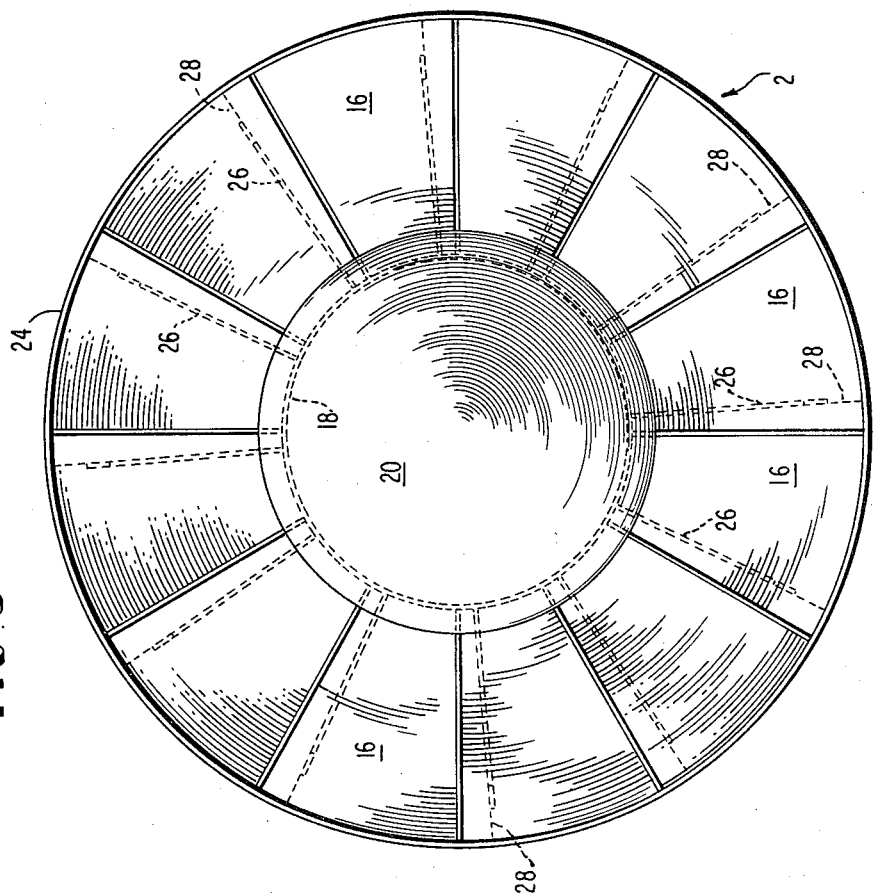

3,885,934

CENTRIFUGAL TUYERE FOR GAS SEPARATOR

REFERENCE TO RELATED APPLICATION

This is a continuation-in-part of our earlier application Ser. No. 177,251 filed Sept. 2, 1971, now abandoned and entitled Centrifugal Tuyere for Gas Separator.

BACKGROUND OF THE INVENTION

The present invention relates to a gas separator, and more particularly to a centrifugal tuyere to be used in removing entrained droplets of liquid from a gas stream. In the past, entrained liquids have been removed from gas streams by the use of mist extractors, generally consisting of a series of vanes which by low velocity and an abrupt change of direction of flow of the gas stream, remove liquid droplets from the stream. Other mist extractors have included wire mesh and the like. Centrifugal or cyclone-type extractors have been used in steam practice and with various chemical vapors in the past, and have been characterized by limited flow rate ranges and excessive pressure drops. U.S. Pat. generally illustrating the prior devices are Alexander, No. 1,703,917; Hawley, No. 1,896,897; Adams, No. 2,068,048; Wright et al, No. 2,565,902; Riggins, No. 3,235,343; and Muller, No. 3,546,854.

SUMMARY

The centrifugal tuyere for a gas separator of the present invention generally includes a plurality of symmetrical inclined blades extending from the center radially outwardly. Each blade has a leading edge, a trailing edge, and upstream and downstream faces which are inclined with respect to the central longitudinal axis of the tuyere and to planes perpendicular thereto. The blades are arranged so that their axial projections overlap whereby there is no open area extending parallel to the longitudinal axis of the tuyere. Gas from an inlet pipe passes through the tuyere where it is given a rapid helical motion. Droplets entrained in the gaseous stream adhere to the tuyere surfaces or are driven outwardly by centrifugal force onto a cylindrical wall which they follow to a liquid collection and drainage area. The cleaned, whirling gas is removed through an outlet pipe which is downstream of and axially aligned with the tuyere. According to the improvement of this invention, the blades of the tuyere are formed with a lip on the downstream edge which forms a trough, serving to collect and direct radially outwardly the liquid which has impinged the blades. The lip projects in an upstream direction and terminates short of the outer extremity of the blade to provide a liquid drain outlet for each blade.

It is preferred that the longitudinal axis of the apparatus be substantially horizontal, but it is expected that it will also operate when vertically oriented. Preferably, the cross-sectional area of the inlet pipe is substantially equal to the minimum flow area of the tuyere measured transverse to the gaseous path so that the gas stream inlet velocity is not greater than that through the tuyere to create an unnecessary pressure drop. Further, it is preferred that the gas outlet pipe have an area the same as the inlet pipe.

At low velocities, because of the overlapped blades, the majority of the entrained liquids in the gas stream impinge the blades, adhere thereto, and coalesce. The adhering liquid, rather than flowing directly off the downstream edges of the blades to be reentrained, is trapped in the troughs formed by the blades and the projecting lips on their trailing edges. The liquid then drains radially outwardly from the blades at the termini of the lips, flowing onto the outer sleeve of the tuyere and the cylindrical inner surface of the vessel or collecting pipe which encloses the tuyere. At high velocities, the pitch angle of the blades causes rapid spinning of the gas stream and entrained liquids, throwing the entrainment outwardly by centrifugal force to the surface of the collecting vessel, where it adheres and coalesces as a liquid. Both effects contribute to the total separation at all velocities.

A principal objective of the invention is to minimize the amount of entrained liquid present at the central area downstream of the tuyere. This is accomplished by the liquid-trapping lip which leads to the outwardly located liquid drain outlet for each blade.

An objective of the present invention is to provide an improved gas separator for efficiently removing entrained liquids from the gas stream over a wide range of velocities, with less pressure drop than has been previously possible.

Another objective of the present invention is to provide a centrifugal separator capable of handling a larger liquid/vapor entrainment ratio than has been practical with previous centrifugal designs, by providing a large agglomerating surface and a tuyere which is effective over a wide velocity range.

Other and further objects, features and advantages will be apparent from an examination of the following description of the presently preferred embodiment of the invention, given for the purpose of disclosure, when taken in conjunction with the accompanying drawings.

BRIEF DESCRIPTION OF THE DRAWINGS

FIG. 3 is an elevational view of the upstream side of the tuyere; and

FIG. 4 is a sectional view of the tuyere.

DESCRIPTION OF THE PREFERRED EMBODIMENT

Figure 1:
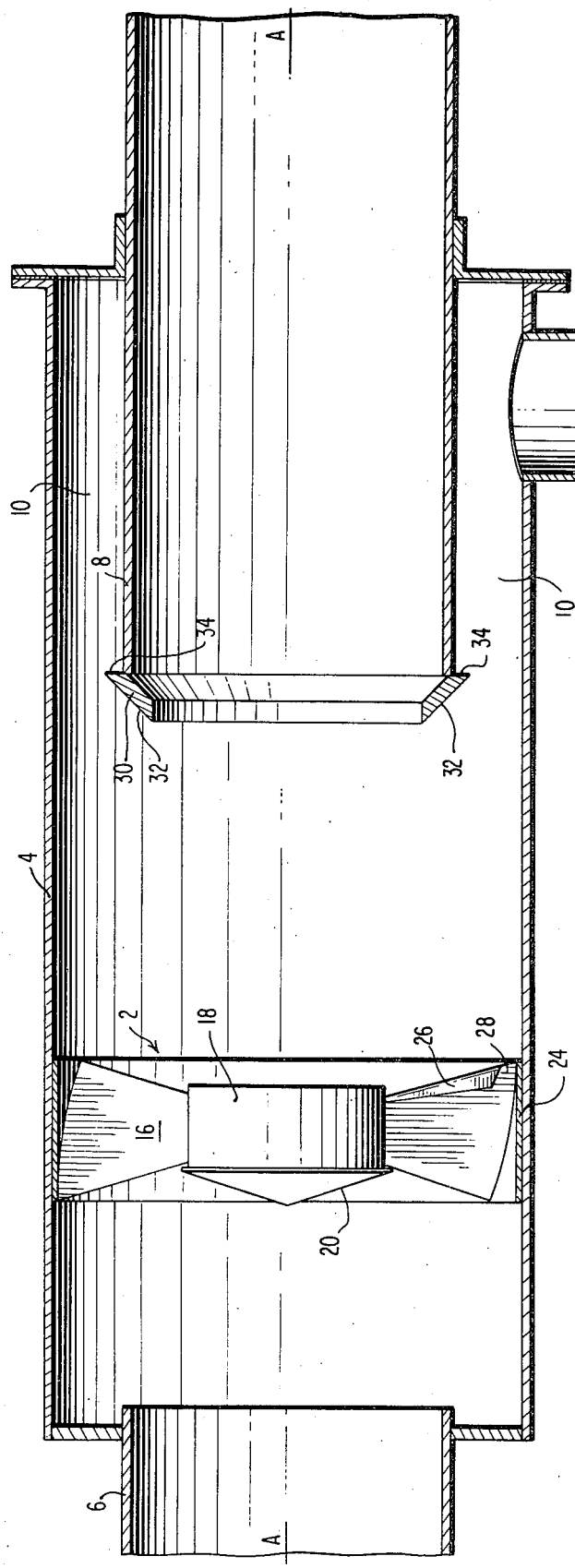
FIG. 1 is a partial sectional view showing the centrifugal tuyere of the present invention mounted within a vessel.

FIG. 1 shows the centrifugal tuyere 2 positioned in a gas separator vessel 4 which includes an inlet 6, and an outlet pipe 8. The elements 2, 4, 6 and 8 are axially aligned and circular in transverse cross-section.

When the apparatus is in use, a gaseous stream with entrained liquid particles is introduced through the inlet pipe, and is deflected by the tuyere 2 to give the stream a helical motion. Some liquid particles adhere to the blades of the tuyere which are constructed to lead the liquid radially outwardly and discharge it in the vicinity of the cylindrical inner wall of the vessel 4. Other liquid particles pass through the tuyere and are thrust outwardly by the helical motion of the gaseous stream, whereupon such particles are collected on and travel in a helical path along the inner wall of the vessel 4. Ultimately, the liquid arrives at the liquid collection area 10 which is at the downstream end of the vessel 4, radially outside the gas outlet pipe 8. This liquid drains into a downcomer pot sump 12 which has an outlet 14 connected to a liquid reservoir at system pressure. The gaseous stream leaves the apparatus through the outlet pipe 8.

Figure 2:
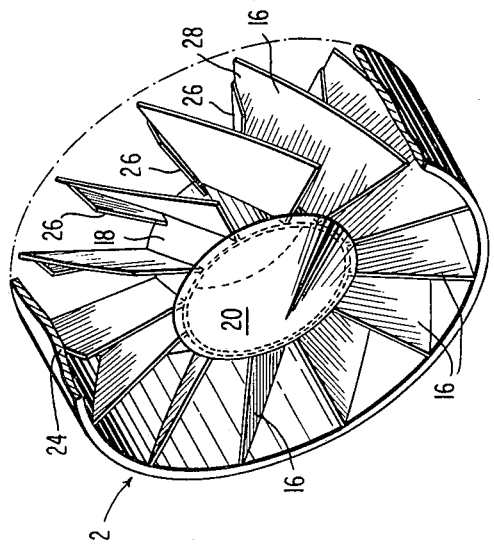
FIG. 2 is a perspective view of the upstream side of the tuyere, broken away to show certain details of construction.

Referring now to FIGS. 2–4, the centrifugal tuyere 2 includes a plurality of blades 16 which extend radially outwardly from a hub 18 at the center of the tuyere. The blades 16 are attached and effectively sealed to the hub. Mounted over the convergence of the blades at their inner ends is a nose cone 20 which shields the hub 18 and deflects the incoming stream onto the front surfaces of the blades. The outer ends of the blades are attached to an outer cylindrical ring 24 by welding or other suitable methods.

Referring now to FIG. 3 which is a view from the upstream side of the tuyere 2, it is seen that the axial projections of blades 16 all overlap so that there is no clear open area axially through the tuyere 2. The blades are preferably set at a 45° angle with respect to the central longitudinal axis A—A of the tuyere. This angle can be changed by design to compensate for flow conditions.

On the trailing edge of each blade 24 there is a lip 26, which extends therefrom and is turned back in an upstream direction toward the front face of the blade to make an acute angle of 45° with the blade. This acute angle may vary, but it preferably is in the order of about 30° to 60°. Each lip lies substantially in a plane which is parallel to the central longitudinal axis A—A of the tuyere. The lips 26 extend from the hub 18 radially outwardly toward the ring 24, but terminate short of the ring 24. By shortening the lip 26, a liquid drainage space 28 is formed between the radial terminus of the lip 26 and the ring 24.

When the tuyere of the present invention is mounted in axial alignment with and adjacent to the inlet pipe 6 as shown in FIG. 1, a gas stream with entrained liquid droplets passing through the tuyere is given a rapid helical motion. The motion throws the droplets outwardly by centrifugal force to the inner wall of the vessel 4 where they adhere. Further, since there is no open area directly axially through the tuyere 22, the gas stream with entrained liquid droplets impinges the nose cone 20 and the various blades 16. Some liquid will coalesce on the nose cone and will be driven by the gaseous stream off the edge on the nose cone and onto the upstream faces of the blades 16. Liquid from the gaseous stream also coalesces on the blades 16 and will run along the blade to the lip 26, then radially outwardly in the trough formed by the lip 26 to the liquid drainage outlet 28, where the liquid will impinge upon and flow along the inner wall of the vessel 4.

As the liquid flows along the length of the liquid collecting vessel 4, due to the general helical downstream movement of the gas therethrough, the liquid reaches the liquid collection area 10 where it flows into the downcomer pot 12. The downcomer pot 12 traps liquid swirling by and transfers it by gravity flow to a reservoir with a liquid level control means that is maintained at system pressure. The gas stream continues its flow by leaving the separator through the gas outlet pipe 8.

Persons acquainted with this art will appreciate that the invention may also be practiced by arranging a plurality of units similar to that of FIG. 1 inside a single enclosure vessel, with the units connected in parallel between the tube sheets at opposite ends of the vessel. As disclosed in our earlier U.S. Pat. application Ser. No. 177,251 filed Sept. 2, 1971, which is incorporated herein by reference, liquid may be removed from each such unit through slots in the vessel 4 and an annular axial opening at the downstream end of the liquid collection area 10.

Three improvements illustrated herein are not attributable to the present inventors. One improvement is the tuyere nose cone 20 which projects radially beyond the hub 18 to deflect liquid onto the forward faces of the blades 16 and deter the migration of liquid longitudinally along the hub 18; and, another such improvement is the deflector 30 on the upstream end of the gas outlet pipe 8, which has a forward inclined surface 32 which deflects an annular portion of the helical gas stream outwardly and a rear face 34 which prevents the upstream migration of liquid from the liquid collection area 10 along and into the gas outlet pipe 8. The third improvement is the enlarged downcomer sump 12 which prevents liquid from backing up in the collection area 10 under conditions of high liquid loading, and permits some gravitational separation of liquid from the gas before the liquid is discharged through the liquid outlet 14.

The present invention has provided a centrifugal tuyere for a gas separator which is particularly useful in removing entrained liquid droplets from a flowing gas stream by a combination of impingement, agglomeration and centrifugal action. The present invention, therefore, is well adapted to carry out the objects and attain the ends and advantages mentioned, as well as others inherent therein. While a presently preferred embodiment of the invention has been given for the purpose of disclosure, numerous changes in the details of construction, and the combination, shape, size and arrangement of parts can be resorted to without departing from the spirit and scope of the invention as hereinafter claimed.

We claim:

1. A centrifugal tuyere for removing entrained liquids from a gas stream, comprising, a plurality of blades extending radially with respect to the central longitudinal axis of the tuyere, each of said blades having upstream and downstream faces which are inclined with respect to planes which lie perpendicular to the central longitudinal axis of the tuyere to impart a rapid helical motion to the gas stream deflected thereby, each of said blades having a leading edge at its upstream end and a trailing edge at its downstream end, each blade having a lip extending along its trailing edge, said lip projecting in an upstream direction therefrom to make an acute angle with said blade to trap liquid which is on the blade and lead the trapped liquid radially outwardly on the blade, said lip terminating at a point radially inwardly of the outer edge of the blade to provide the outer end of the blade with an unobstructed liquid draining space located to permit liquid trapped by the lip to be released from the blade to impinge upon and flow along the inner wall of a vessel housing the tuyere.

2. The centrifugal tuyere of claim 1 in combination with a vessel housing the centrifugal tuyere, an inlet pipe which is axially aligned with the centrifugal tuyere and positioned to direct a gas stream with entrained liquids on the upstream end of the centrifugal tuyere, a gas outlet pipe which is axially aligned with the centrifugal tuyere and downstream thereof, and a liquid collection area located radially outside the gas outlet pipe.

3. The centrifugal tuyere of claim 1 wherein the lips lie in planes which are substantially parallel to the central longitudinal axis of the tuyere.

4. The centrifugal tuyere of claim 1 wherein the lips lie at an angle of about 30° to 60° with respect to their respective blades.

5. The centrifugal tuyere of claim 1 wherein the blades are set at an angle of about 45° with respect to the axis of the tuyere.

6. The centrifugal tuyere of claim 5 wherein the lips lie at an angle of about 30° to 60° with respect to their respective blades.

7. The centrifugal tuyere of claim 5 wherein the lips lie in planes which are substantially parallel to the central longitudinal axis of the tuyere.

8. The centrifugal tuyere of claim 7 wherein the lips lie at an angle of about 30° to 60° with respect to their respective blades.

9. The improvement in a gas separator for use in removing entrained liquids from a gas stream, including:
a separator chamber,
an inlet tube directing the gas stream into the chamber,
a centrifugal tuyere mounted in the chamber in an extension of the inlet tube,
the tuyere including a plurality of symmetrical inclined blades extending from the center radially outwardly,
the trailing edge of each blade having a liquid trapping lip extending therealong and therefrom defining therewith a trough to trap liquid, said lip being spaced from the inner surface of said chamber to define,
a liquid draining outlet at the radially outward end of each lip, said liquid draining outlet being located to release liquid for impingement upon the inner wall of the separator chamber,
a liquid collecting tube extending from the tuyere,
a coaxial gas outlet tube mounted within the liquid collecting tube downstream from the tuyere, and
means arranged to remove collected liquid from the liquid collecting tube.

* * * * *